United States Patent [19]
Yamanaka et al.

[11] Patent Number: 5,900,984
[45] Date of Patent: May 4, 1999

[54] AIR GAP PRISM AND METHOD FOR PRODUCING SAME

[75] Inventors: Mutsuhiro Yamanaka, Osaka; Masahiro Nishio, Ikoma, both of Japan

[73] Assignee: Minolta Co., Ltd., Osaka, Japan

[21] Appl. No.: 08/731,357

[22] Filed: Oct. 11, 1996

[30] Foreign Application Priority Data

Oct. 13, 1995 [JP] Japan ................................ 7-265400

[51] Int. Cl.⁶ ............................ G02B 27/14; G02B 5/06
[52] U.S. Cl. ...................... 359/638; 359/832; 359/833; 359/900
[58] Field of Search ..................... 359/831, 832, 359/833, 834, 618, 629, 638, 639, 487, 496, 500, 900

[56] References Cited

U.S. PATENT DOCUMENTS

| | | | |
|---|---|---|---|
| 2,420,606 | 5/1947 | McLeod et al. | 359/831 |
| 2,807,922 | 10/1957 | Newcomer et al. | 359/831 |
| 3,704,934 | 12/1972 | Holmes et al. | 359/832 |
| 4,084,180 | 4/1978 | Stoffels et al. | 359/833 |
| 4,784,469 | 11/1988 | Tsukada et al. | 359/831 |
| 5,625,448 | 4/1997 | Ranalli et al. | 356/71 |

FOREIGN PATENT DOCUMENTS

| | | | |
|---|---|---|---|
| A 60-216303 | 10/1985 | Japan | 359/833 |
| 63-274902 | 11/1988 | Japan | G02B 5/04 |
| A 63-298202 | 12/1988 | Japan | 359/831 |
| A 1-251001 | 10/1989 | Japan | 359/831 |
| 2-19093 | 1/1990 | Japan | H04N 9/097 |
| A 3-89210 | 4/1991 | Japan | 359/831 |
| A 4-335314 | 11/1992 | Japan | 359/831 |

*Primary Examiner*—Cassandra Spyrou
*Assistant Examiner*—John Juba, Jr.
*Attorney, Agent, or Firm*—McDermott, Will & Emery

[57] ABSTRACT

An assembly method of an air gap prism which has an air gap between a first glass member and a second glass member, the assembly method having steps of setting a first glass member on a positioning member, setting a sheet member on the positioning member so as to cover the first glass member, setting a second glass member on the first glass member covered with the sheet member so as to sandwich the sheet member between the first glass member and the second glass member, and cutting a portion of the sheet member protruding from the first glass member and the second glass member.

16 Claims, 4 Drawing Sheets

AIR GAP PRISM AND METHOD FOR PRODUCING SAME

BACKGROUND OF THE INVENTION

1. Field of the Invention

The present invention relates to and air gap prism for use in double-plate image sensing devices, and method for producing same.

2. Description of the Related Art

Heretofore, image sensing devices which incorporate a plurality of image sensing elements and an optical prism have been proposed as image sensing devices with image sensing elements used in video cameras or digital cameras or the like for the purpose of high resolution. One example of am effective optical prism is an air gap prism comprising an assembly of a plurality of glass members and provided with air gaps between said glass members.

Metal foil (e.g., Japanese Examined Patent Application No. HEI 6-60962), and resin film have been used as the material of members supporting the air gap.

There are methods of forming beforehand an air gap supporting area on a surface corresponding to a glass member instead of using a thin plate-like air gap supporting member.

Examples of such methods of forming an air gap supporting area include methods wherein resin or the like is applied like printing and hardened (e.g., Japanese Laid-Open Patent Application No. HEI 2-19093), and methods wherein a metal or dielectric member is applied by vacuum deposition.

Astigmatic difference, a type of astigmatism, occurs because the air gap of an air gap prism is provided at an inclination relative to the optical axis of the image forming optical system, and is a factor adversely affecting image forming characteristics. Since the magnitude of this astigmatic difference is proportional to the thickness of the air gap, it is desirable that the air gap is made thin within a range which does not produce interference of the light rays, and theoretically suitable values are less than 10 microns. It is important that the air gaps are parallel since astigmatic difference is markedly larger and causes adverse affects such as color separation when the surfaces forming the air gap are not parallel.

In high precision image sensing devices of recent years, there has been demand for high precision optical systems via high density pixel arrangements of image sensing elements. In optical prisms, there has been demand for producing thinner air gaps with higher precision.

In the case of air gap supporting areas formed in direct contact with glass members, the air gap is controlled by the support member thickness during said formation. Although the position and thickness of the formed air gap supporting members are accurate in methods for vacuum deposition of metals and dielectrics, the cost increases over the time required for a vacuum deposition process to obtain a desired thickness.

On the other hand, although methods of applying resin and the like are economical in terms of time and materials and the process itself is simple, a large number of man hours are required to adjust conditions for the resin application. Furthermore, the thin plate-like air gap supporting members have individual differences relative to uniformity of thickness and are subject to deterioration, making them unsuitable for high precision image sensing devices demanding high accuracy in the degree of parallelism and dimensions of the air gaps.

Thin plate-like air gap supporting members have many long, narrow, band-like sections which, during assembly, are difficult to accurately place at desired positions on a surface corresponding to a glass member.

Metal foil air gap supporting members are expensive due to the various processes involved to eliminate sections protruding from the prism during formation as well as suppressing surface reflection. In contrast, resin film provides easy formation and excellent precision at low cost, but are readily susceptible to creasing, bending, and wrinkling at thicknesses of 10 micron and less, such that assembly of the prism is extremely difficult.

SUMMARY OF THE INVENTION

A first object of the present invention is to provide an inexpensive and easy-to-produce air gap prism.

A second object of the present invention is to provide a more compact air gap prism having a high precision air gap suitable for use in high precision image sensing devices, and which is inexpensive and easy to produce.

A third object of the present invention is to provide an air gap prism manufacturing device capable of producing an air gap prism inexpensively and easily.

A fourth object of the present invention is to provide an air gap prism manufacturing device capable of easily and inexpensively producing a more compact and high precision air gap prism suitable for use in high precision image sensing devices.

A fifth object of the present invention is to provide an air gap prism manufacturing device that does not produce dislocation of the air gap supporting members relative to the prism when manufacturing the air gap prism.

A sixth object of the present invention is to provide an air gap prism manufacturing device that does not produce dislocation of the air gap supporting members relative to the prism when manufacturing the air gap prism, and which is provide with common positioning member common to the air gap prism and air gap supporting members.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The preferred embodiments of the present invention are described hereinafter with reference to the accompanying drawings.

The air gap prism provided with three image sensing elements in the present invention is used in image input devices requiring high precision images such as, for example, video cameras and digital cameras.

Figure 1:
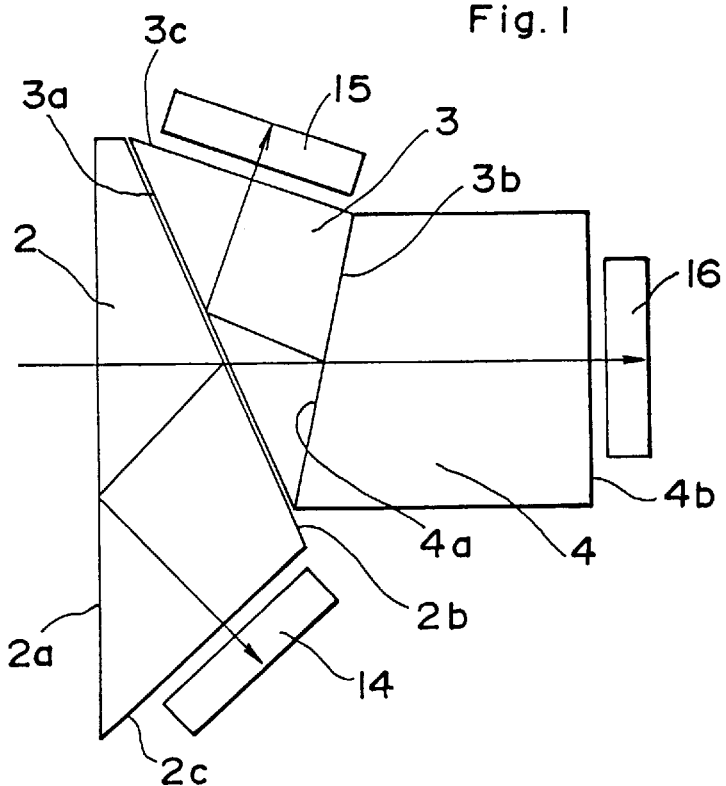
FIG. 1 shows the optical path of a Phillips type air gap prism.

FIG. 1 shows an air gap prism of the so-called Phillips type. In the drawing, reference number 2 refers to a first glass member, reference number 3 refers to a second glass member, and reference number 4 refers to a third glass member. An air gap of from 10 to 10+ microns in thickness is provided between the output surface 2b of first glass member 2 and the input surface 3a of second glass member 3 so as to realize to reflection by the second glass member.

Figure 2:
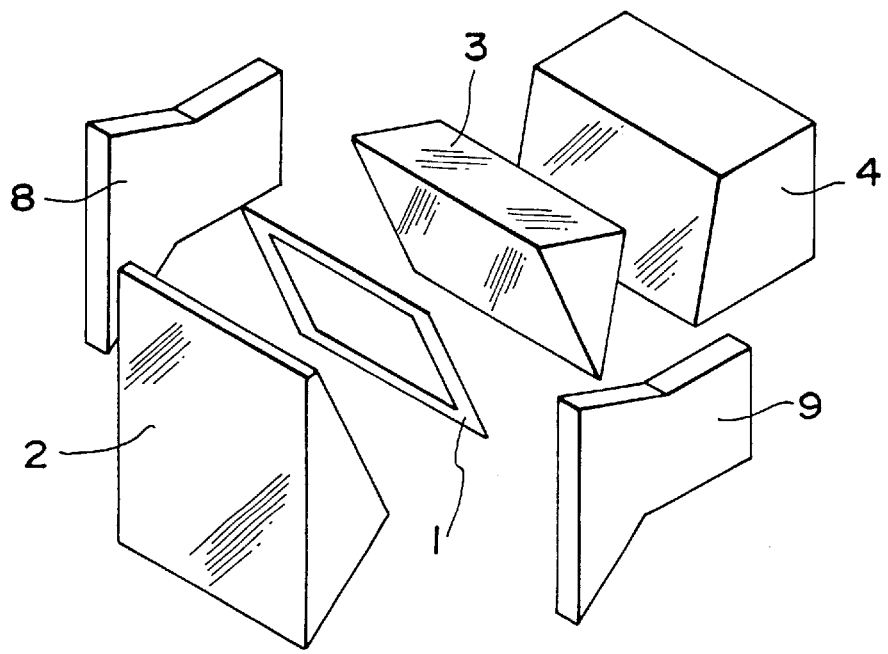
FIG. 2 is an exploded view of a Phillips type air gap prism.

FIG. 2 is an exploded view of the air gap prism of FIG. 1. Reference number 1 refers to a thin plate-like air gap supporting member, and reference numbers 8 and 9 are side panels for anchoring the assembled glass members. Second glass member 3 and third glass member 4 are attached, and these members and first glass member 2 circumscribe air gap supporting member 1, so as to be attached via side panel 8 and side panel 9. As a result, an air gap corresponding to the thickness of the air gap supporting member 1 can be formed between said first glass member 2 and second glass member 3.

Figure 3:
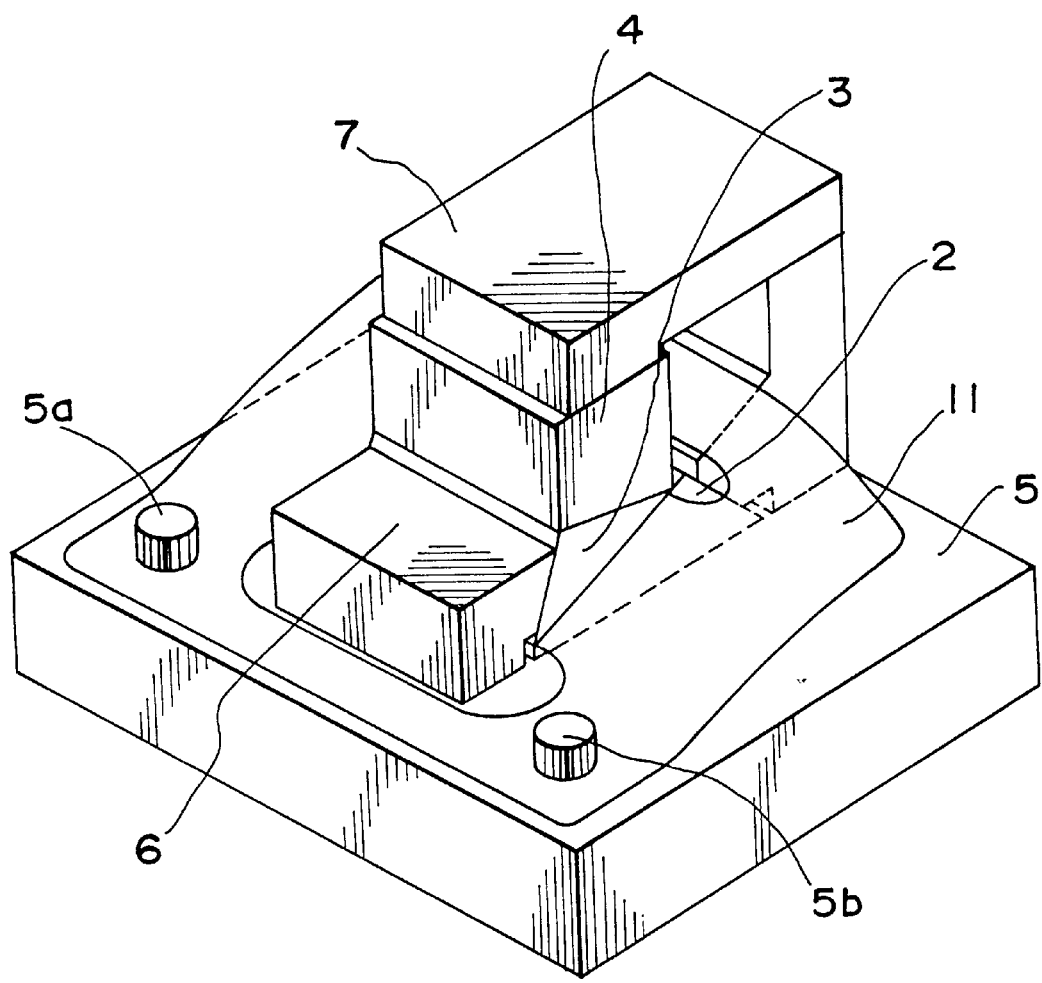
FIG. 3 is an illustration showing the assembled state of the air gap prism of a first embodiment.

In FIG. 3, reference number 11 refers to a thin plate-like air gap supporting member, reference number 2 refers to a first glass member, reference number 3 refers to a second glass member, and reference number 4 refers to a third glass member. The output surfaces of these three glass members are respectively provided with image sensing elements 14, 15, and 16 attached via adhesive.

The subject light entering from the input surface 2a of first glass member 2 travels the optical path shown in FIG. 1, divided in thirds, passes through the output surface of the respective glass members, and enters the respective image sensing elements. The three image data obtained are used to obtain a high precision image via image processing such as shifting and combining pixels.

FIG. 3 shows the assembled state of the air gap prism. The members used in the assembly of the aforesaid components include the following: reference number 5 refers to a first positioning member, reference number 6 refers to a second positioning member, and reference number 7 refers to a holding member. Reference numbers 5a and 6a refer to protrusions for positioning the air gap supporting member 11 during installation.

After the first glass member 2 is installed at first positioning member 5 with input surface 2a face down orientation, air gap supporting member 11 is placed on input surface 2a. At this time, air gap supporting member 11 is provided with the configuration shown in FIG. 4 and described later, and is positioned when protrusions 5a and 5b are inserted in holes 11a and 11b.

Then, air gap support member 11 is circumscribed by the input surface 3a of second glass member 3. The third glass member 4 is attached to the second glass member 3 beforehand. When air gap supporting member 11 is circumscribed, the second positioning member 6 is placed along output surface 3c, and altogether holding member 7 is pressed down against the output surface 4b of third glass member 4 to temporarily hold the first glass member 2 and second glass member 3 with sandwiching the air gap support member 11 therebetween. The holding member 7 has a configuration so as to press the output surface 2c of first glass member 2 such that the entire surface of the member when attached does not shift on the first positioning member.

Figure 4:
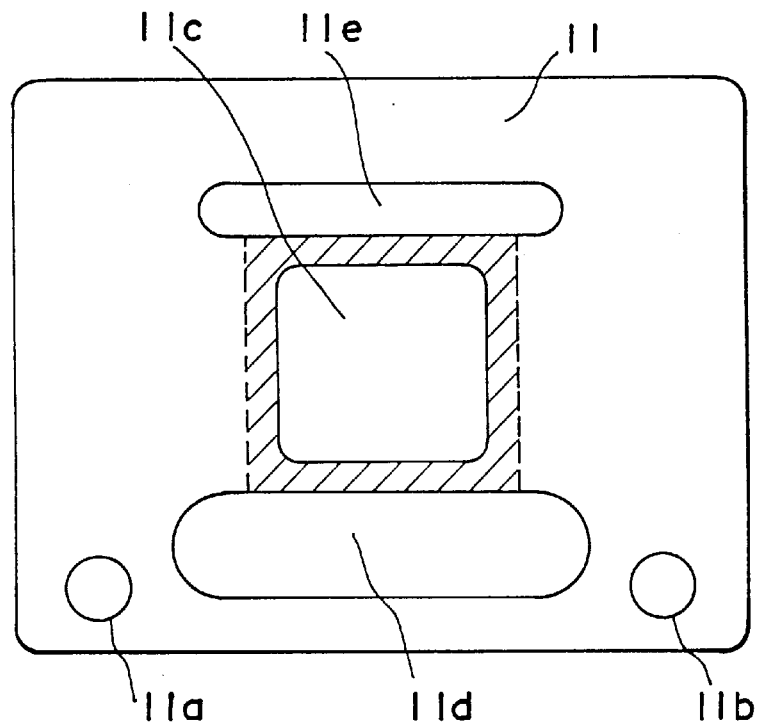
FIG. 4 shows the configuration of the air gap supporting members of the first embodiment.

FIG. 4 shows the configuration of the air gap supporting member before assembly in the first embodiment. Reference number 11 refers to an air gap supporting member comprising a thin plate-like polyimide film having a thickness of 7.5 microns, and reference numbers 11a and 11b are holes used for positioning. Furthermore, the center of the member has slot-like holes 11d and 11e are provided above and below a square hole 11c through which passes the luminous flux.

In the state shown in FIG. 3, only the region of diagonal lines is circumscribed by output surface 2b of first glass member 2 and input surface 3a of second glass member 3. Portions protruding from the glass members are removed using methods such as cutting or the like after temporary attachment to the glass members. Thereafter, side panels 8 and 9 are adhered, and when adhesion is completed, the glass member are removed from the positioning members.

The air gap supporting member 11 is accurately placed at a predetermined position in a simple operation by checking and verifying protrusion 5a and hole 11a, and protrusion 5b and hole 11b. The protrusions and holes used for positioning may be increased in number as necessary, and the holes may be replaced by slots to improve the ease of the operation and accuracy of positioning.

Figure 5:
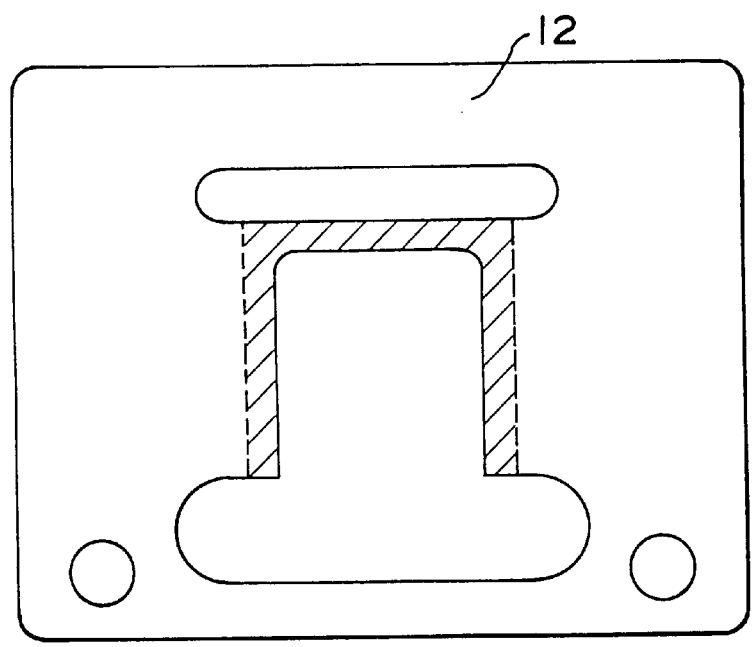
FIG. 5 shows the configuration of the air gap supporting members of the second embodiment.

FIG. 5 shows the configuration of the air gap supporting member before assembly in a second embodiment. Reference number 12 refers to an a thin plate-like air gap supporting member having a different configuration than that of the first embodiment. After assembly via the same method described in the first embodiment shown in FIG. 3, the portion outside the area of diagonal lines is removed. After assembly of the prism is completed, only the area shaded by diagonal lines remains, and the air gap supporting member circumscribes three sides of the area transmitting luminous flux.

Figure 6:
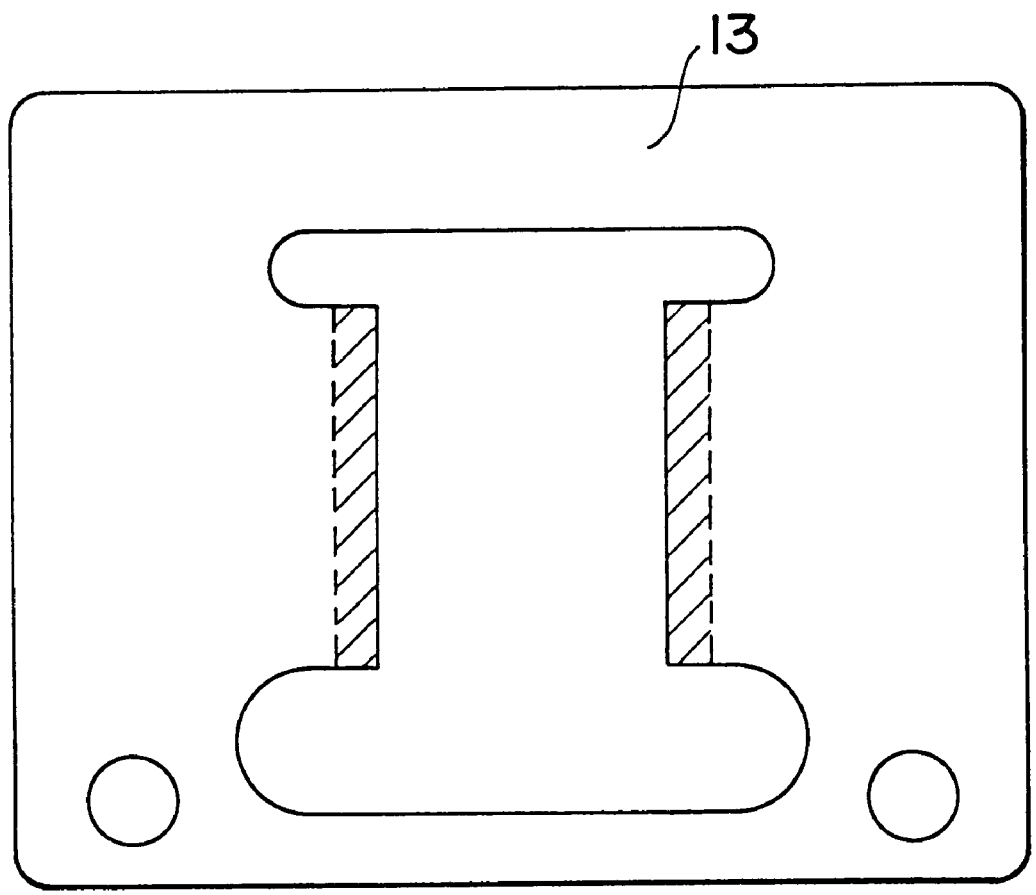
FIG. 6 shows the configuration of the air gap supporting members of the third embodiment.

FIG. 6 shows the configuration of an air gap supporting member before assembly in a third embodiment. Reference number 13 refers to a thin plate-like air gap supporting member having a different configuration than those of the first and second embodiment. After assembly by the same method as used in the first embodiment of FIG. 3, the portion outside the diagonal lines is removed. After assembly of the prism is completed, only the area shaded by diagonal lines remains, and the air gap supporting member is arranged in bands on two sides of the area transmitting luminous flux.

In the second embodiment, luminous flux is not obstructed on the bottom side, and in the third embodiment, luminous flux is not obstructed in either the top or bottom sides, such that the polished surface of the glass members can be utilized more efficiently.

The present invention as described above provides inexpensive and easy production of air gap prisms having a highly precise air gap capable of being applied to high precision image sensing devices. The present invention further provides particularly marked improvement of operability in using inexpensive and easily formed resin film, as well as a major cost reduction effect. The present invention further promotes more compact design of the overall prism by increasing the freedom in designing the size and configuration of the air gap supporting member and the excellent precision of positioning.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A method of assembling and air gap prism which has an air gap between a first glass member and a second glass member, said method comprising steps of:

sandwiching a sheet member between a first glass member and a second glass member, said sheet member having an inner perimeter defining a hole in the sheet member a part of said inner perimeter of said sheet member protruding beyond said first glass member and said second glass member; and cutting a portion of said sheet member protruding from said first glass member and said second glass member.

2. The method as claimed in claim 1, wherein said sheet member is sandwiched so as not to intrude into portions of said first and second glass members through which luminous flux passes.

3. The method as claimed in claim 2, wherein said sheet member is sandwiched by an edge portion of a facing surface of said first and second glass members.

4. The method as claimed in claim 3, wherein said sheet member is sandwiched by a part of the edge portion.

5. An air gap prism comprising:

a first glass member, a second glass member, and an air gap therebetween; and a sheet member sandwiched between said first glass member and said second glass member, said sheet member having a hole in a portion of the sheet member, said hole covered by said first and second glass members such that only a part of an inner perimeter of the sheet member defining said hole contacts facing surfaces of said first and second glass members; wherein a portion of said sheet member protruding from said first glass member and said second glass member has been cut away.

6. The air gap prism as claimed in claim 5, wherein said hole in said sheet member provides a space through which luminous flux passes.

7. The air gap prism as claimed in claim 6, wherein said sheet member is sandwiched by edge portions of said facing surfaces of said first and second glass members.

8. The air gap prism as claimed in claim 7, wherein said sheet member is sandwiched by less than all of the edge portions.

9. A method of assembling an air gap prism which has an air gap between a first glass member and a second glass member, said method comprising steps of:

setting a first glass member on a positioning member;

setting a sheet member on the positioning member so as to cover the first glass member, said sheet member having an inner perimeter defining a hole in the sheet member a part of said inner perimeter of said sheet member protruding beyond said first glass member;

setting a second glass member on the first glass member covered with the sheet member so as to sandwich a portion of the sheet member between the first glass member and the second glass member; and cutting a portion of the sheet member protruding from the first glass member and the second glass member.

10. The method as claimed in claim 9, wherein said sheet member is sandwiched so as not to intrude into portions of said first and second glass members through which luminous flux passes.

11. The method as claimed in claim 10, wherein said sheet member is sandwiched by an edge portion of a facing surface of said first and second glass members.

12. The method as claimed in claim 11, wherein said sheet member is sandwiched by a part of the edge portion.

13. A method for assembling an air gap prism which includes, a first optical member having an input surface, a first output surface and a second output surface, a second optical member having an input surface, a first output surface and a second output surface, and an air gap between said first and second optical members, wherein the light entering from said input surface of said first optical member travels from said first optical member to said second optical member through the first output surface of the first optical member, the air gap and the input surface of the second optical member, divides in thirds on it's travel path, and goes out of the air gap prism from said second output surface of the first optical member and said first and second output surfaces of the second optical member, said method comprising steps of:

sandwiching a sheet member between the first output surface of the first optical member and the input surface of the second optical member to form said air gap therebetween, said sheet member having an inner perimeter defining a hole in the sheet member a part of said inner perimeter of said sheet member protruding beyond said first optical member and said second optical member;

cutting a portion of said sheet member protruding from said second optical member; and fixing the first and second optical members to each other with a remaining portion of said sheet member sandwiched between said first and second optical members.

14. The method as claimed in claim 13, wherein said sandwiching step includes steps of:

mounting the first optical member on a platform with the first output surface thereof in a face up orientation;

placing the sheet member on the first output surface of the first optical member mounted on the platform;

mounting the second optical member on the first output surface of the first optical member with the input surface thereof face in a downward orientation to sandwich the sheet member between the first output surface of the first optical member and the input surface of the second optical member; and temporarily holding the first and second optical member to each other with the sheet member sandwiched therebetween.

15. The method as claimed in claim 14, wherein the sheet member is positioned on said first output surface of the first optical member by inserting protrusions of the platform in holes of the sheet member in said placing step.

16. The method as claimed in claim 14, wherein the first and second optical members are fixed to each other by adhering a side panel in said fixing step.

* * * * *